(12) United States Patent
Yang et al.

(10) Patent No.: US 12,010,621 B2
(45) Date of Patent: Jun. 11, 2024

(54) METHOD AND DEVICE FOR TRANSMITTING A WAKE UP SIGNAL, AND STORAGE MEDIUM

(71) Applicant: ZTE CORPORATION, Shenzhen (CN)

(72) Inventors: Weiwei Yang, Shenzhen (CN); Bo Dai, Shenzhen (CN); Kun Liu, Shenzhen (CN); Huiying Fang, Shenzhen (CN); Luanjian Bian, Shenzhen (CN); Youjun Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 166 days.

(21) Appl. No.: 17/633,879

(22) PCT Filed: Aug. 10, 2020

(86) PCT No.: PCT/CN2020/108150
§ 371 (c)(1),
(2) Date: Feb. 8, 2022

(87) PCT Pub. No.: WO2021/027769
PCT Pub. Date: Feb. 18, 2021

(65) Prior Publication Data
US 2022/0330151 A1   Oct. 13, 2022

(30) Foreign Application Priority Data
Aug. 9, 2019 (CN) .......................... 201910735909.4

(51) Int. Cl.
*H04W 52/02* (2009.01)
(52) U.S. Cl.
CPC ... *H04W 52/0229* (2013.01); *H04W 52/0212* (2013.01); *H04W 52/0274* (2013.01)

(58) Field of Classification Search
CPC ......... H04W 52/0229; H04W 52/0212; H04W 52/0274; H04W 52/0235; H04W 52/0216; Y02D 30/70
See application file for complete search history.

(56) References Cited

U.S. PATENT DOCUMENTS

| 9,603,065 | B2 * | 3/2017 | Nory ................. H04W 52/0219 |
| 11,546,850 | B2 * | 1/2023 | Wilhelmsson .... H04W 52/0238 |

(Continued)

FOREIGN PATENT DOCUMENTS

| CN | 109041180 A | 12/2018 |
| CN | 110536386 A | 12/2019 |

(Continued)

OTHER PUBLICATIONS

Intel Corporation, "UE-group Wake-up Signal for eMTC", *3GPP TSG RAN WG1 Meeting #94bis R1-1810736*, Oct. 12, 2018 (Oct. 12, 2018), sections 1-6.

(Continued)

*Primary Examiner* — Ryan W Sherwin
(74) *Attorney, Agent, or Firm* — Morgan, Lewis & Bockius LLP (57) ABSTRACT

Provided are a method and device for transmitting a wake up signal, and a storage medium. The method includes: a wake up signal sent by a second node is received by a first node at a first position; where the wake up signal includes at least one of a group wake up signal or a common wake up signal; the wake up signal is detected by the first node by using a sequence corresponding to the wake up signal; and a detection of a physical downlink control channel corresponding to the wake up signal is determined by the first node according to a detection result of the wake up signal.

18 Claims, 2 Drawing Sheets

(56) References Cited

U.S. PATENT DOCUMENTS

| | | | |
|---|---|---|---|
| 11,751,132 B2* | 9/2023 | Wong | H04W 68/005 370/318 |
| 2004/0185820 A1* | 9/2004 | Ogura | H04W 52/0245 455/343.1 |
| 2006/0112287 A1* | 5/2006 | Paljug | G06F 1/3209 713/300 |
| 2009/0129306 A1* | 5/2009 | Twitchell, Jr. | H04L 67/145 370/311 |
| 2013/0128785 A1* | 5/2013 | Guey | H04W 76/28 370/311 |
| 2013/0128788 A1* | 5/2013 | Guey | H04W 76/28 370/311 |
| 2016/0219574 A1* | 7/2016 | Ribeiro | H04W 52/0229 |
| 2019/0028243 A1 | 1/2019 | Kim et al. | |
| 2019/0149343 A1* | 5/2019 | Murali | H04L 12/12 370/338 |
| 2019/0191372 A1* | 6/2019 | Murali | H04L 27/06 |
| 2019/0274103 A1* | 9/2019 | Gan | H04W 52/0229 |
| 2019/0327679 A1* | 10/2019 | Gupta | H04W 76/27 |
| 2020/0029302 A1* | 1/2020 | Cox | H04W 52/0216 |
| 2020/0169954 A1* | 5/2020 | Namba | H04W 4/06 |
| 2020/0245137 A1* | 7/2020 | Chitrakar | H04W 52/0219 |
| 2021/0076329 A1* | 3/2021 | Kasslin | H04W 76/28 |
| 2021/0136687 A1* | 5/2021 | Liu | H04W 72/00 |
| 2022/0182938 A1* | 6/2022 | Ye | H04W 52/0232 |
| 2024/0007846 A1* | 1/2024 | Kneckt | H04W 52/0258 |

FOREIGN PATENT DOCUMENTS

| | | | | |
|---|---|---|---|---|
| EP | 3 860 160 A1 | 8/2021 | | |
| EP | 3 911 029 A1 | 11/2021 | | |
| EP | 3704899 B1 * | 12/2021 | | H04L 5/0048 |
| EP | 3 952 479 A1 | 2/2022 | | |
| EP | 3682677 B1 * | 3/2023 | | H04W 52/0229 |
| WO | WO 2018/175760 A1 | 9/2018 | | |
| WO | WO 2019/019960 A1 | 1/2019 | | |
| WO | WO2019/0066846 A1 | 4/2019 | | |

OTHER PUBLICATIONS

International Search Report for Application No. PCT/CN2020/108150, dated Nov. 12, 2020, 4 pages including English translation.

Qualcomm, "Remaining Issues of 6.2.6.3 Wake-up Signal", *3GPP TSG RAN WG1 Meeting #93 R1-1807528*, May 25, 2018 (May 25, 2018), sections 1-4.

Sierra Wireless, "efeMTC Key Issue Summary for PUSCH Sub-PRB Allocation", 3GPP TSG RAN WG1 Meeting #93, R1-1807428, May 21-15, 2018, Busan, Korea, 20 pages.

Australian Office Action in Application No. 2020329417 dated Nov. 25, 2022, 4 pages.

Chinese Office Action in Application No. 201910735909.4 dated Oct. 19, 2022, 10 pages, including translation.

Chinese First Search Report in Application No. 2019107359094 dated Oct. 11, 2022, 4 pages including translation.

Extended European Search Report in Application No. 208521104 dated Aug. 16, 2023, 10 pages.

* cited by examiner

METHOD AND DEVICE FOR TRANSMITTING A WAKE UP SIGNAL, AND STORAGE MEDIUM

CROSS-REFERENCE TO RELATED APPLICATIONS

This is a National Stage Application, filed under 35 U.S.C. 371, of International Patent Application No. PCT/CN2020/108150, filed on Aug. 10, 2020, which claims priority to Chinese Patent Application No. 201910735909.4, filed with the China National Intellectual Property Administration (CNIPA) on Aug. 9, 2019, disclosures of which are incorporated herein by reference in their entireties.

TECHNICAL FIELD

The present application relates to wireless communication networks, and for example, to a method and device for transmitting a wake up signal, and a storage medium.

BACKGROUND

The network may send the paging message to user equipments (UEs) in the idle state and the connected state. A paging procedure may be triggered by a core network to inform one UE of the reception of a paging request, or may be triggered by an Evolutional Node B (eNB) to inform the update of system information. The paging message is scheduled by a physical downlink control channel (PDCCH) scrambled using a P-radio network temporary identifier (RNTI) and transmitted on a physical downlink shared channel (PDSCH). A terminal detects a corresponding PDCCH at a paging occasion (PO) to determine whether a PDSCH indicated by the PDCCH carries the paging message, if the terminal has not detected the corresponding PDCCH at the PO, which represents that there is no paging message at this PO, and at this time, the terminal is in the sleep state and does not receive data until the next PO to perform the detection. This mode is referred to as discontinuous reception (DRX). That is, the terminal needs to perform a blind detection of the PDCCH at each PO, and the power consumption of the terminal is relatively large.

In order to reduce the power consumption of the terminal, a wake up signal (WUS) is introduced, and a base station sends a signal indicating whether to perform a PDCCH detection before each PO. The terminal firstly detects the WUS and determines whether to detect the corresponding PDCCH according to a detection result of the WUS: when the WUS is detected, then the terminal detects a PDCCH corresponding to the WUS; otherwise, the terminal does not detect the PDCCH. Due to the introduction of the WUS, the number of detecting the PDCCH by the terminal is reduced, thus reducing the power consumption of the terminal.

However, the WUS is for all terminals of the same PO, that is, any one of the terminals at the same PO needs to be woken up, the base station may send the WUS, so other terminals at the same PO are woken up, and all these terminals detect the PDCCH, which increases the number of times of unnecessary detection on the PDCCH by the terminals.

SUMMARY

The present application provides a method for transmitting a wake up signal, a device for transmitting a wake up signal, and a storage medium, so as to reduce power consumption of the first node.

An embodiment of the present application provides a method for transmitting a wake up signal. The method includes the following: a wake up signal sent by a second node is received by a first node at a first position; where the wake up signal includes a group wake up signal and/or a common wake up signal; the wake up signal is detected by the first node by using a sequence corresponding to the wake up signal; and a detection of a physical downlink control channel corresponding to the wake up signal is determined by the first node according to a detection result.

An embodiment of the present application provides a method for transmitting a wake up signal. The method includes the following: a sequence corresponding to a wake up signal to be sent is determined by a second node; and the sequence corresponding to the wake up signal is sent to a first node by the second node at a first position; where the wake up signal includes a group wake up signal and/or a common wake up signal.

An embodiment of the present application provides a device for transmitting a wake up signal. The device includes a processor, and the processor is configured to, when executing a computer program, implement the method for transmitting a wake up signal described in any one of the above embodiments.

An embodiment of the present application provides a storage medium. The storage medium stores a computer program, and the computer program, when executed by a processor, implements the method for transmitting a wake up signal described in any one of the embodiments of the present application.

With respect to the above embodiments and other aspects of the present application and implementations thereof, further description is provided in the accompanying drawings description, detailed description and claims.

DETAILED DESCRIPTION

Embodiments of the present application will be described below with reference to the accompanying drawings. It should be noted that the embodiments and features of the embodiments in the present application may be arbitrarily combined with each other without conflict.

Figure 1:
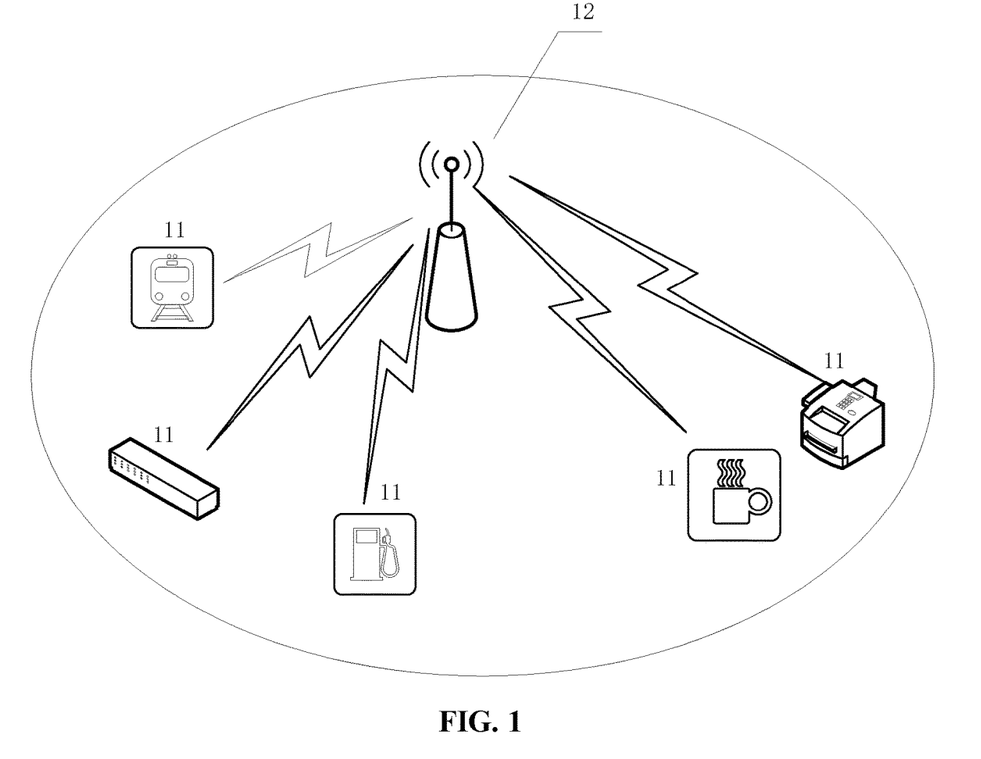
FIG. 1 is a schematic diagram of an application scenario of a method for transmitting a wake up signal provided in an embodiment.

A method for transmitting a wake up signal provided in the present application may be applied to a communication system consisting of a first node and a second node. FIG. 1 is a schematic diagram of an application scenario of the method for transmitting a wake up signal provided in an embodiment. As shown in FIG. 1, the second node 12 and each of the first nodes 11 form a communication system. The communication system may be a global system for mobile communications (GSM), a general group radio service (GPRS) system, a code division multiple access (CDMA) system, a CDMA2000 system, a wideband code division multiple access (WCDMA) system, a long term evolution (LTE) system, a long term evolution advanced (LTE-A) system, or a worldwide interoperability for microwave access (WiMAX) system. The communication system may also be a narrowband-Internet of things (NB-IoT) system, or a machine type communication (MTC) system. In the communication system, the second node 12 may send a wake up signal to the first node 11 before sending a paging message scheduled by a PDCCH scrambled with a paging radio network temporary identifier (P-RNTI) to the first node 11, the first node 11 determines a starting position of the wake up signal according to a time interval configured by signaling, the length of the wake up signal configured by the signaling, and a starting position of the PDCCH. The first node 11 firstly detects the wake up signal, and determines whether to detect the corresponding PDCCH according to a detection result of the wake up signal. However, in the above process, when any one of first nodes 11 at the same PO needs to be woken up, the second node 12 sends the wake up signal, and then other first nodes on the same PO are woken up. These first nodes detect the PDCCH, which wastes power consumption of the first nodes, so that the group wake up signal and the common wake up signal may be introduced, but how to determine a corresponding sequence is not given.

The present application provides a method for transmitting a wake up signal, which reduces the number of blind detections of a PDCCH by the first node, thus reducing the power consumption of the first node.

Figure 2:
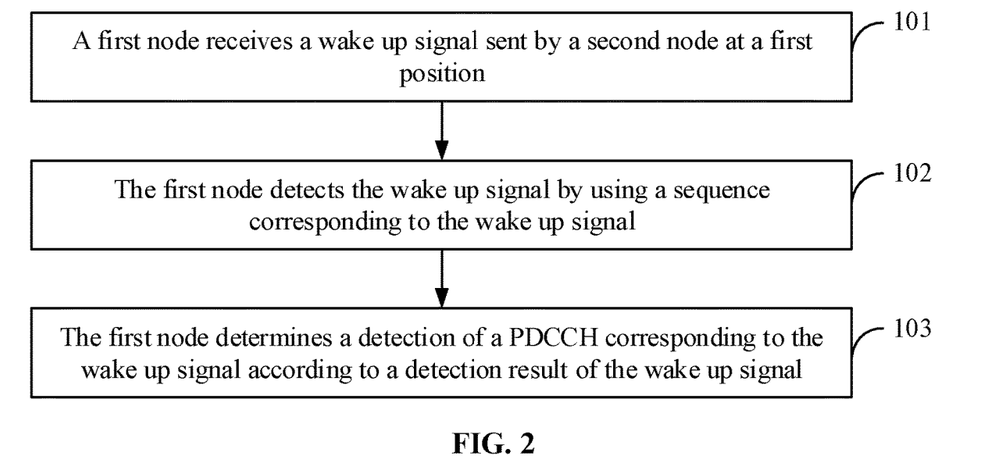
FIG. 2 is a flowchart of a method for transmitting a wake up signal provided in an embodiment.

FIG. 2 is a flowchart of a method for transmitting a wake up signal provided in an embodiment. As shown in FIG. 2, the method provided in this embodiment includes the following.

In 101, a wake up signal sent by a second node is received by a first node at a first position.

The wake up signal includes a group wake up signal and/or a common wake up signal.

The first node in this embodiment may be a device that provides voice and/or other traffic data connectivity for users, a handheld device having a wireless connectivity capability, or other processing devices connected to a wireless modem. The first node may communicate with one or more core networks via a radio access network (RAN), and the first node may be a mobile terminal such as a mobile telephone (or "cellular" telephone) and a computer having the mobile terminal, e.g., a mobile device which may be portable, pocket, hand-held, computer-included, or vehicle-mounted, and they exchange language and/or data with the radio access network. For example, a personal communication service (PCS) phone, a cordless phone, a session initiation protocol (SIP) phone, a wireless local loop (WLL) station, a personal digital assistant (PDA). The first node may also be referred to as a system, a subscriber unit, a subscriber station, a mobile station, a mobile, a remote station, a remote terminal, an access terminal, a user terminal, a user agent, and a user device or a user equipment, which is not limited herein. Exemplarily, the first node in this embodiment may be a terminal device that may perform machine type communication (MTC) traffic, such as a smart meter, a smart water meter.

The second node in this embodiment may be a base station (a base transceiver station (BTS)) in a GSM system or a CDMA system, a base station (NodeB, NB) in a WCDMA system, an eNB in an LTE system, a relay station, an access point, a base station in a 5th Generation (5G) system, and the like, which is not limited herein.

In this embodiment, the second node may send the wake up signal to the first node at the first position, the wake up signal may include the group wake up signal, may include the common wake up signal, or may include both the group wake up signal and the common wake up signal. The group wake up signal in this embodiment refers to a wake up signal for a group of first nodes at the same PO. The common wake up signal refers to wake up signals for groups of first nodes on the same WUS resource, or the common wake up signal refers to wake up signals for groups of nodes at the same PO.

In an embodiment, assuming that the number of wake up signal resources in the same time interval configured by signaling is 2, the position where a resource configured by the signaling is located is a first selectable position. A second selectable position is implicitly determined by the first selectable position. Before 101, the first node needs to determine whether the first position where a wake up signal corresponding to the first node is located is the first selectable position or the second selectable position. The first node determines the first position according to at least one of a corresponding group index, a corresponding service type, a corresponding index of a paging occasion or a preset second threshold.

In one implementation, the first node determines the first position according to the corresponding group index and the second threshold.

In an embodiment, if the group index corresponding to the first node is less than the second threshold, the first node determines that the first selectable position is the first position; and if the group index corresponding to the first node is greater than or equal to the second threshold, the first node determines that the second selectable position is the first position.

In an embodiment, if the group index corresponding to the first node is less than the second threshold, the first node determines that the second selectable position is the first position; and if the group index corresponding to the first node is greater than or equal to the second threshold, the first node determines that the first selectable position is the first position. In another implementation, the first node determines the first position according to an index of the corresponding paging occasion, the corresponding group index, and the second threshold.

In an embodiment, when the index of the corresponding paging occasion is an odd number, if the corresponding group index is less than the second threshold, the first node determines that the first selectable position is the first position, and if the corresponding group index is greater than or equal to the second threshold, the first node determines that the second selectable position is the first position. When the index of the corresponding paging occasion is an even number, if the corresponding group index is less than the second threshold, the first node determines that the second selectable position is the first position and if the corresponding group index is greater than or equal to the second threshold, the first node determines that the first selectable position is the first position.

In an embodiment, when the index of the corresponding paging occasion is an even number, if the corresponding group index is less than the second threshold, the first node determines that the first selectable position is the first position, and if the corresponding group index is greater than or equal to the second threshold, the first node determines that the second selectable position is the first position. When the index of the corresponding paging occasion is an odd number, if the corresponding group index is less than the second threshold, the first node determines that the second selectable position is the first position, and if the corresponding group index is greater than or equal to the second threshold, the first node determines that the first selectable position is the first position.

In another implementation, the first node determines the first position according to the corresponding service type.

In an embodiment, if the service type corresponding to the first node is a first type, the first node determines that the first selectable position is the first position; and if the service type corresponding to the first node is a second type, the first node determines that the second selectable position is the first position.

In an embodiment, if the service type corresponding to the first node is the first type, the first node determines that the second selectable position is the first position; and if a service type corresponding to the first node is the second type, then the first node determines that the first selectable position is the first position.

In another implementation, the first node determines the first position according to the corresponding service type and the index of the corresponding paging occasion.

In an embodiment, when the index of the corresponding paging occasion is an even number, if the service type corresponding to the first node is the first type, the first node determines that the first selectable position is the first position, and if the service type corresponding to the first node is the second type, the first node determines that the second selectable position is the first position. When the index of the corresponding paging occasion is an odd number, if the service type corresponding to the first node is the first type, the first node determines that the second selectable position is the first position, and if the service type corresponding to the first node is the second type, the first node determines that the first selectable position is the first position.

In an embodiment, when the index of the corresponding paging occasion is an odd number, if the service type corresponding to the first node is the first type, the first node determines that the first selectable position is the first position, and if the service type corresponding to the first node is the second type, the first node determines that the second selectable position is the first position. When the index of the corresponding paging occasion is an even number, if the service type corresponding to the first node is the first type, the first node determines that the second selectable position is the first position, and if the service type corresponding to the first node is the second type, the first node determines that the first selectable position is the first position.

It should be noted that the second threshold is a positive integer equal to or greater than 0.

In another implementation, the first node determines the first position according to first signaling. The first signaling may be position indication signaling.

In an embodiment, the position indication signaling is 1 bit. When the position indication signaling is 1, the first node determines that the first selectable position is the first position; and when the position indication signaling is 0, the first node determines that the second selectable position is the first position. Alternatively, when the position indication signaling is 0, the first node determines that the first selectable position is the first position; and when the position indication signaling is 1, the first node determines that the second selectable position is the first position.

After the first node determines the first position, the wake up signal sent by the second node is received at the first position.

In an embodiment, when the first node detects the wake up signal at the first selectable position and the second selectable position, a sequence set corresponding to the wake up signal remains unchanged.

In 102: the wake up signal is detected by the first node by using a sequence corresponding to the wake up signal.

After the wake up signal is received by the first node, the wake up signal is detected by using the sequence corresponding to the wake up signal.

Corresponding to the wake up signal including the group wake up signal, 102 is that: the first node determines a first parameter in the sequence corresponding to the group wake up signal according to at least one of a corresponding group index, the number of group wake up signals corresponding to the same time interval, the number of group wake up signals corresponding to the same wake up signal resource, the number of group wake up signals corresponding to the same service type, a service type corresponding to the first node, or all service types. After the first parameter is determined, the first node may determine the sequence corresponding to the wake up signal according to the first parameter, and then detect the wake up signal by using the sequence. The detection here may be to determine an energy value of the sequence related to the wake up signal. It should be noted that the first node may also determine the sequence corresponding to the wake up signal in advance.

Corresponding to the wake up signal including the common wake up signal, in one implementation, 102 is that: the first node determines a first parameter in the sequence corresponding to a first common wake up signal according to at least one of a corresponding group index, a service type corresponding to the first node, higher-layer signaling, or a preset first threshold. In another implementation, 102 is that: the first node determines a first parameter in the sequence corresponding to a second common wake up signal according to at least one of higher-layer signaling or a legacy wake up signal.

The group index here may be the group index determined by the first node, or a group index notified to the first node by the higher layer.

In an embodiment, the first parameter in the sequence is X in the sequence $$W_g(m) = W(m) * e^{\frac{j*2*\pi*n*f(X)}{G}}$$

of the wake up signal, where W(m) is a sequence corresponding to a legacy wake up signal; G, m, and n are positive integers greater than 0; and X is the first parameter. A value range of X is {1, 2, ..., X max}. The legacy wake up signal herein refers to a wake up signal in the related art.

In an embodiment, a value of G is a fixed value, for example, the value of G is 132. Alternatively, G is a prime number greater than 132. Alternatively, G is 132*a, where a is a number greater than 0, exemplarily, a=0.5, or a=0.25, or a=1/11, or a=1/12, or a=2. Alternatively, the value of G is determined according to the maximum number of sequences required, e.g. G=X max+1, for example, f(X)=h+X*k. In one implementation, a value of h is a predetermined positive integer greater than or equal to 0, exemplarily, h=0. In another implementation, a value of k is a predetermined positive integer greater than 0, exemplarily, k=13, or k=1.

In an embodiment, a value of f(X) is a preset value. A specific value is determined from preset values according to X. In one implementation, the preset value is X max prime numbers of prime numbers less than G; alternatively, in one implementation, the preset value is X max prime numbers. Assuming that G=132, X max=10, then the value of f(X) includes 10 of prime numbers less than 132. Assuming that G=132, X max=18, then the value of f(X) includes 18 of the prime numbers less than 132.

An implementation of how to determine the first parameter in the sequence corresponding to the group wake up signal in a scenario where the wake up signal includes the group wake up signal is described below.

In one implementation, the first node determines the first parameter in the sequence corresponding to the group wake up signal according to the group index. The group index may be a group index that corresponds to the group wake up signal corresponding to the first node and is determined by the higher layer.

Assuming that $f(X)=h+X*k$, $h=2$ and $k=13$, when the group index corresponding to the first node is 0, and $X=0$, so $f(X)=2$. The group index corresponding to the first node is numbered from 0.

Assuming that $f(X)=h+X*k$, $h=2$ and $k=13$, when the group index corresponding to the first node is 1, and $X=0$, so $f(X)=2$. Since the group index corresponding to the first node is numbered from 1, the calculation of $f(X)$ is performed with $X-1$.

In another implementation, the first node determines the first parameter in the sequence corresponding to the group wake up signal according to the corresponding group index and the number of group wake up signals corresponding to the same wake up signal resource. The group index here may be the group index that corresponds to the corresponding group wake up signal and is determined by the first node.

X=mod (the group index, the number of group wake up signals corresponding to the same wake up signal resource).

Assuming that $f(X)=h+X*k$, and $h=0$, X=mod (the group index, the number of group wake up signals corresponding to the same wake up signal resource); alternatively, $h>0$, X=mod ((the group index−1), the number of group wake up signals corresponding to the same wake up signal resource).

Assuming that $f(X)=h+X*k$, $h=0$, two wake up signal resources are configured, the number of group wake up signals on each of the two wake up signal resources is 4, and the group index corresponding to the terminal is 1, then X=mod (1, 4)=1.

Assuming that $f(X)=h+X*k$, $h=0$, two wake up signal resources are configured, the number of group wake up signals on each of the two wake up signal resources is 4, and the group index corresponding to the terminal is 1, then X=mod (0, 4)=0.

In another implementation, the first node determines the first parameter in the sequence corresponding to the group wake up signal according to the corresponding group index, the number of group wake up signals corresponding to the same service type, and all service types. The group index here may be the group index that corresponds to the corresponding group wake up signal and is determined by the first node.

In an embodiment, $X=\Sigma_{f=0}^{F-1} n_f + \text{group\_ID}$, where group_ID is the group index corresponding to the first node, F is the total number of service types, a value of $n_0$ is 0, $n_f$ is the number of group wake up signals corresponding to a $f^{th}$ type of service type, or $n_f$ is the number of group wake up signals and common wake up signals corresponding to a $f^{th}$ type of service type.

Assuming that the system includes two types of service types, the first node belongs to the first type, the number of group wake up signals corresponding to each service type is 4, and the group index corresponding to the first node is 1, then X=1 (because F=1).

Assuming that the system includes two types of service types, the first node belongs to the second type, the number of group wake up signals corresponding to each service type is 4, and the group index corresponding to the first node is 1, then X=5.

Assuming that the system includes two types of service types, the number of group wake up signals corresponding to each of the two service types is 2 and 3, respectively, the first node belongs to the first type, the group index corresponding to the first node is 1, then X=1.

Assuming that the system includes two types of service types, the number of group wake up signals corresponding to each of the two service types is 2 and 3, respectively, the first node belongs to the second type, the group index corresponding to the first node is 1, then X=3.

Assuming that the system includes two types of service types, the number of group wake up signals corresponding to each of the two service types is 2 and 3, respectively, the number of common wake up signals corresponding to the first service type is 1, the first node belongs to the second type, and the group index corresponding to the first node is 1, then X=4.

In another implementation, the first node determines the first parameter in the sequence corresponding to the group wake up signal according to the corresponding group index, the service type corresponding to the first node, and the number of group wake up signals of the same service type. The group index here may be the group index that corresponds to the corresponding group wake up signal and is determined by the first node.

$X=q*(w-1)+\text{group\_ID}$, where q is the number of group wake up signals corresponding to the same service type, and w is an index of the service type corresponding to the first node. The number of group wake up signals corresponding to each service type is q.

Assuming that the system includes two types of service types, the number of group wake up signals corresponding to each of the two service types is 2, the first node belongs to the first type, namely, the index of the service type corresponding to the first node is 1, and the group index corresponding to the first node is 1, then X=1.

Assuming that the system includes two types of service types, the number of group wake up signals corresponding to each of the two service types is 2, the first node belongs to the second type, namely, the index of the service type corresponding to the first node is 2, and the group index corresponding to the first node is 1, then X=3.

In another implementation, the first node determines the first parameter in the sequence corresponding to the group wake up signals according to the corresponding group index and the number of group wake up signals corresponding to the same time interval. The group index here may be the group index determined by the first node.

X=mod (group_ID, the number of group wake up signals corresponding to the same time interval/T), where group_ID is numbered from 0.

X=mod ((group_ID−1), the number of group wake up signals corresponding to the same time interval/T), where group_ID is numbered from 1.

In an embodiment, T=2.

Assuming that the number of group wake up signals of the same time interval is 8 and the group index corresponding to the first node is 4 (which is numbered from 0), then X=0.

An implementation of how to determine the first parameter in the sequence corresponding to the first common wake up signal in a scenario where the wake up signal includes the common wake up signal is described below.

In one implementation, the first node determines the first parameter in the sequence corresponding to the first common wake up signal according to the group index and the first threshold.

Exemplarily, when the group index is less than the first threshold, X=X max−1. Alternatively, when the group index is greater than or equal to the first threshold, X=X max. Alternatively, assuming that X max=13, the first threshold is 4, and the group index corresponding to the first node is 4, then X=13.

In another implementation, the first node determines the first parameter in the sequence corresponding to the first common wake up signal according to the service type corresponding to the first node.

In an embodiment, when the service type corresponding to the first node is the first service type, the first parameter X in the sequence corresponding to the first common wake up signal is equal to X max−1. When the service type corresponding to the first node is the second service type, the first parameter X in the sequence corresponding to the first common wake up signal is equal to X max.

Assuming that X max=13, when the service type corresponding to the first node is the first service type, the first parameter X in the sequence corresponding to the first common wake up signal is equal to 12. When the service type corresponding to the first node is the second service type, the first parameter X in the sequence corresponding to the first common wake up signal is equal to 13.

In an embodiment, the first parameter X in the sequence corresponding to the first common wake up signal is equal to X max only when the service type corresponding to the first node is the second service type.

Assuming that X max=13, when the service type corresponding to the first node is the second service type, the first parameter X in the sequence corresponding to the first common wake up signal is equal to 13. Assuming that X max=13, when the service type corresponding to the first node is the first service type, the first node does not have a corresponding first common wake up signal.

In one implementation, the first node determines the first parameter in the sequence corresponding to the first common wake up signal according to the group index, the higher-layer signaling and the first threshold.

Exemplarily, when the higher-layer signaling is enabled, if the group index is less than the first threshold, X=X max−2, or if the group index is greater than or equal to the first threshold, X in the sequence corresponding to the first common wake up signal is equal to X max−1. When the higher-layer signaling is not enabled, if the group index is less than the first threshold, X in the sequence corresponding to the first common wake up signal is X max−1, or if the group index is larger than or equal to the first threshold, X in the sequence corresponding to the first common wake up signal is equal to X max. The higher-layer signaling indicates whether the second common wake up signal is enabled.

In another implementation, the first node determines the first parameter in the sequence corresponding to the first common wake up signal according to the service type corresponding to the first node and the higher-layer signaling.

In an embodiment, when the higher-layer signaling is enabled, if the service type corresponding to the first node is the first service type, the first parameter X in the sequence corresponding to the first common wake up signal is equal to X max−2, if the service type corresponding to the first node is the second service type, the first parameter X in the sequence corresponding to the first common wake up signal is equal to X max−1. When the higher-layer signaling is not enabled if the service type corresponding to the first node is the first service type, the first parameter X in the sequence corresponding to the first common wake up signal is equal to X max−1, if the service type corresponding to the first node is the second service type, the first parameter X in the sequence corresponding to the first common wake up signal is equal to X max. The higher-layer signaling indicates whether the second common wake up signal is enabled.

In another implementation, the first node determines the first parameter in the sequence corresponding to the second common wake up signal according to at least one of the higher-layer signaling or the legacy wake up signal.

In an embodiment, when the higher-layer signaling is enabled and the legacy wake up signal is not sent, X in the sequence corresponding to the second common wake up signal is equal to 0; and when the higher-layer signaling is enabled and the legacy wake up signal is sent, X in the sequence corresponding to the second common wake up signal is equal to X max. The higher-layer signaling indicates whether the second common wake up signal is enabled.

In an embodiment, the first parameter may also be an index of a sequence in a set of predefined sequences.

In 103, the first node determines a detection of a PDCCH corresponding to the wake up signal according to a detection result.

A detection manner is the related technology and is not repeated here, and one detection manner is that the detection result is an energy value of the sequence related to the wake up signal. If the first node determines that the energy value is greater than a preset energy threshold, the PDCCH corresponding to the wake up signal is detected; and if the first node determines that the energy value is less than or equal to the preset energy threshold, the PDCCH corresponding to the wake up signal is not detected.

In the method for transmitting a wake up signal provided in this embodiment, the second node may send the group wake up signal to the first nodes when only one group of first nodes need to be woken up, and may send the common wake up signal to the first nodes when multiple groups of first nodes need to be woken up. After the wake up signal is received by the first node, the sequence corresponding to the group wake up signal and/or the common wake up signal is used for detection on the wake up signal, and the detection of the PDCCH corresponding to the wake up signal is determined according to the detection result, so that the number of blind detections of the PDCCH by the first node is reduced, thus the power consumption of the first node is reduced, and meanwhile, the resource overhead caused by the signal is reduced.

According to the method for transmitting a wake up signal provided in this embodiment, the wake up signal sent by the second node is received by the first node at the first position; where the wake up signal includes the group wake up signal and/or the common wake up signal; the wake up signal is detected by the first node by using the sequence corresponding to the wake up signal; and the detection of the physical downlink control channel corresponding to the wake up signal is determined by the first node according to the detection result, so that the number of blind detections of the PDCCH by the first node is reduced, thus the power consumption of the first node is reduced, and meanwhile, the resource overhead caused by the wake up signal is reduced.

Figure 3:
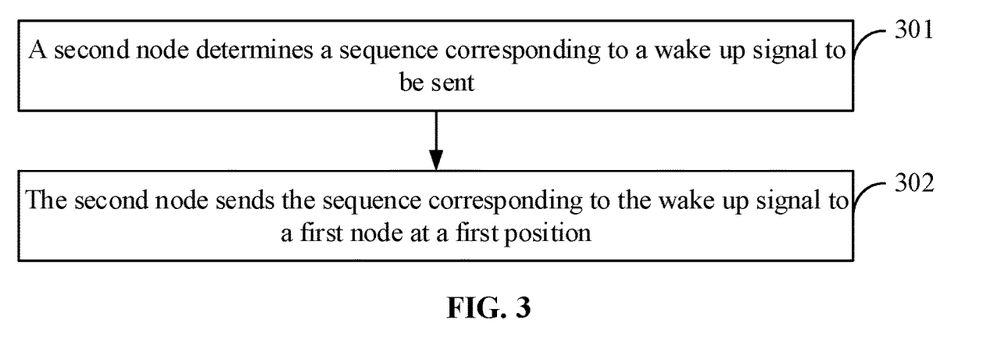
FIG. 3 is a flowchart of another method for transmitting a wake up signal provided in an embodiment.

FIG. 3 is a flowchart of another method for transmitting a wake up signal provided in an embodiment. As shown in FIG. 3, the method provided in this embodiment includes the following.

In 301, a second node determines a sequence corresponding to a wake up signal to be sent.

In 302, the second node sends the sequence corresponding to the wake up signal to a first node at a first position.

The wake up signal includes a group wake up signal and/or a common wake up signal.

In a scenario where the wake up signal includes the group wake up signal, 301 may be implemented as follows: the second node determines a first parameter in the sequence corresponding to the group wake up signal according to at least one of a group index corresponding to the wake up signal to be sent, the number of group wake up signals corresponding to the same time interval, the number of group wake up signals corresponding to the same wake up signal resource, the number of group wake up signals corresponding to the same service type, a corresponding service type, or all service types.

In a scenario where the wake up signal includes the common wake up signal, 301 may be implemented as follows: the second node determines a first parameter in the sequence corresponding to a first common wake up signal according to at least one of the number of first common wake up signals to be sent, a corresponding service type, higher-layer signaling, or a preset first threshold.

In another scenario where the wake up signal includes the common wake up signal, 301 may be implemented as follows: the second node determines the first parameter in the sequence corresponding to a second common wake up signal according to at least one of higher-layer signaling or a legacy wake up signal.

In an embodiment, the first parameter in the sequence is X in a sequence $$W_g(m) = W(m) * e^{\frac{j*2*\pi*n*f(X)}{G}}$$

of the wake up signal, where W(m) is a sequence corresponding to a legacy wake up signal, G is a positive integer greater than 0, X is the first parameter, and m and n are positive integers greater than or equal to 0. A value range of X is $\{1, 2, \ldots, X\ max\}$.

In an embodiment, a value of G is a fixed value, for example, the value of G is 132. Alternatively, G is a prime number greater than 132. Alternatively, G is 132*a, where a is a number greater than 0, exemplarily, a=0.5, or a=0.25, or a=1/11, or a=1/12, or a=2. Alternatively, the value of G is determined according to the maximum number of sequences required, for example, G=X max+1, or the value of G is determined according to the number of group wake up signals and common wake up signals.

In an embodiment, f(X)=h+X*k. In one implementation, a value of h is a predetermined positive integer greater than or equal to 0, exemplarily, h=0. In another implementation, a value of k is a predetermined positive integer greater than 0, exemplarily, k=13, or k=1.

In an embodiment, a value of f(X) is a preset value. A value is determined from preset values according to X. In one implementation, the preset value is X max prime numbers of prime numbers less than G; alternatively, in one implementation, the preset value is X max prime numbers. Assuming that G=132, and X max=10, then the value of f(X) includes 10 of prime numbers less than 132. Assuming that G=132, and X max=18, then the value of f(X) includes 18 of prime numbers less than 132.

An implementation of how to determine the first parameter in the sequence corresponding to the group wake up signal in a scenario where the wake up signal includes the group wake up signal is described below.

In one implementation, the second node determines the first parameter in the sequence corresponding to the group wake up signal according to the group index. The group index here may be a group index that corresponds to the group wake up signal and is notified by the higher layer.

In another implementation, the second node determines the first parameter in the sequence corresponding to the group wake up signal according to the corresponding group index and the number of group wake up signals corresponding to the same wake up signal resource. The group index here may be a group index that corresponds to the corresponding group wake up signal and is determined by the first node.

X=mod (the group index, the number of group wake up signals corresponding to the same wake up signal resource).

Assuming that f(X)=h+X*k, and h=0, X=mod (the group index, the number of group wake up signals corresponding to the same wake up signal resource); alternatively, h>0, X=mod ((the group index−1), the number of group wake up signals corresponding to the same wake up signal resource).

In another implementation, the second node determines the first parameter in the sequence corresponding to the group wake up signal according to the corresponding group index, the number of group wake up signals corresponding to the same service type, and the all service types.

In an embodiment, $X=\Sigma_{f=0}^{F-1} n_f + \text{group\_ID}$, where group_ID is the group index, F is the total number of service types, a value of no is 0, $n_f$ is the number of group wake up signals corresponding to a $f^{th}$ type of service type, or $n_f$ is the number of group wake up signals and common wake up signals corresponding to a $f^{th}$ type of service type.

In another implementation, the second node determines the first parameter in the sequence corresponding to the group wake up signal according to the corresponding group index, the corresponding service type, and the number of group wake up signals of the same service type. The group index here may be the group index that corresponds to the corresponding group wake up signal and is determined by the first node.

X=q*(w−1)+group_ID, where q is the number of group wake up signals corresponding to the same service type, and w is an index of the service type corresponding to the group wake up signal to be sent. The number of group wake up signals corresponding to each service type is q.

In another implementation, the second node determines the first parameter in the sequence corresponding to the group wake up signal according to the group index corresponding to the group wake up signal to be sent and the number of group wake up signals corresponding to the same time interval. The group index here may be the group index determined by the first node.

X=mod (group_ID, the number of group wake up signals corresponding to the same time interval/T). In an embodiment, T=2.

An implementation of how to determine the first parameter in the sequence corresponding to the first common wake up signal in a scenario where the wake up signal includes the common wake up signal is described below.

In one implementation, the second node determines the first parameter in the sequence corresponding to the common wake up signal according to the number of first common wake up signals to be sent, the group index, and the first threshold.

When the number of first common wake up signals to be sent is greater than 1 and the corresponding group indexes are all less than the first threshold, X=X max−1. When the number of first common wake up signals to be sent is greater than 1 and the corresponding group indexes are all greater than or equal to the first threshold, X=X max.

In another implementation, the second node determines the first parameter in the sequence corresponding to the first common wake up signal according to the number of common wake up signals to be sent and the service type corresponding to the first common wake up signal.

When the number of first common wake up signals to be sent is greater than 1, and the corresponding service types are all the first service type, the first parameter X in the sequence corresponding to the first common wake up signal is equal to X max−1. When the number of first common wake up signals to be sent is greater than 1 and the corresponding service types are all the second service type, the first parameter X in the sequence corresponding to the first common wake up signal is equal to X max.

In one implementation, the second node determines the first parameter in the sequence corresponding to the common wake up signal according to the number of first common wake up signals to be sent.

When the number of first common wake up signals to be sent is 1, the first parameter X in the sequence corresponding to the first common wake up signal is equal to X max−1.

In one implementation, the second node determines the first parameter in the sequence corresponding to the first common wake up signal according to the number of first common wake up signals to be sent, the group index, the higher-layer signaling, and the first threshold.

When the higher-layer signaling is not enabled, if the number of first common wake up signals to be sent is greater than 1 and the corresponding group indexes are all less than the first threshold, X=X max−1; if the number of first common wake up signals to be sent is greater than 1 and the corresponding group indexes are all greater than or equal to the first threshold, X=X max.

When the higher-layer signaling is enabled, if the number of first common wake up signals to be sent is greater than 1 and the corresponding group indexes are all less than the first threshold, X=X max−2; if the number of first common wake up signals to be sent is greater than 1 and the corresponding group indexes are all greater than or equal to the first threshold, X=X max−1.

The higher-layer signaling is signaling that indicates whether the second common wake up signal is enabled.

In another implementation, the second node determines the first parameter in the sequence corresponding to the first common wake up signal according to the number of first common wake up signals to be sent, the service type corresponding to the first common wake up signal, and the higher-layer signaling.

When the higher-layer signaling is not enabled, if the number of first common wake up signals to be sent is greater than 1 and the corresponding service types are all the first service type, the first parameter X in the sequence corresponding to the common wake up signal is equal to X max−1; and if the number of common wake up signals to be sent is greater than 1 and the corresponding service types are all the second service type, the first parameter X in the sequence corresponding to the first common wake up signal is equal to X max.

When the higher-layer signaling is enabled, if the number of first common wake up signals to be sent is greater than 1 and the corresponding service types are all the first service type, the first parameter X in the sequence corresponding to the common wake up signals is equal to X max−2; if the number of common wake up signals to be sent is greater than 1 and the corresponding service types are all the second service type, the first parameter X in the sequence corresponding to the first common wake up signal is equal to X max−1.

The higher-layer signaling is signaling that indicates whether the second common wake up signal is enabled.

In another implementation, the second node determines the first parameter in the sequence corresponding to the first common wake up signal according to the number of first common wake up signals to be sent and the higher-layer signaling.

When the higher-layer signaling is enabled, and the number of first common wake up signals to be sent is 1, the first parameter X in the sequence corresponding to the first common wake up signal is equal to X max−1.

Alternatively, when the higher-layer signaling is enabled, and the number of first common wake up signals to be sent is 1, the first parameter X in the sequence corresponding to the first common wake up signal is equal to X max.

When the higher-layer signaling is enabled and the legacy wake up signal is not sent, in the sequence corresponding to the second common wake up signal, h=0, and X=0.

When the higher-layer signaling is enabled and the legacy wake up signal is sent, in the sequence corresponding to the second common wake up signal, h=0, and X=X max.

In an embodiment, assuming that the number of wake up signal resources in the same time interval configured by signaling is 2, a position where a resource configured by the signaling is located is a first selectable position. A second selectable position is implicitly determined by the first selectable position. The second node needs to determine whether the first position where the wake up signal to be sent is located is the first selectable position or the second selectable position. In an embodiment, the second node determines the first position according to at least one of a corresponding group index, a corresponding service type, a corresponding index of a paging occasion or a preset second threshold.

In one implementation, the second node determines the first position according to the corresponding group index and the second threshold.

In an embodiment, if the group index corresponding to the wake up signal to be sent is less than the second threshold, the second node determines that the first selectable position is the first position; and if the group index corresponding to the wake up signal to be sent is greater than or equal to the second threshold, the second node determines that the second selectable position is the first position.

In an embodiment, if the group index corresponding to the wake up signal to be sent is less than the second threshold, the second node determines that the second selectable position is the first position; and if the group index corresponding to the wake up signal to be sent is greater than or equal to the second threshold, the second node determines that the first selectable position is the first position.

In another implementation, the second node determines the first position according to the index of a paging occasion corresponding to the wake up signal to be sent, a corresponding group index, or the second threshold.

In an embodiment, when the index of the corresponding paging occasion is an odd number, if the corresponding group index is less than the second threshold, the second node determines that the first selectable position is the first position, and if the corresponding group index is greater than or equal to the second threshold, the first node determines that the second selectable position is the first position. When the index of the corresponding paging occasion is an even number, if the corresponding group index is less than the second threshold, the second node determines the second selectable position is the first position; and if the corresponding group index is greater than or equal to the second threshold, the second node determines that the first selectable position is the first position.

In an embodiment, when the index of the corresponding paging occasion is an even number, if the corresponding group index is less than the second threshold, the second node determines that the first selectable position is the first position, and if the corresponding group index is greater than or equal to the second threshold, the second node determines that the second selectable position is the first position. When the index of the corresponding paging occasion is an odd number, if the corresponding group index is less than the second threshold, the second node determines the second selectable position is the first position; and if the corresponding group index is greater than or equal to the second threshold, the second node determines that the first selectable position is the first position.

In another implementation, the second node determines the first position according to the service type corresponding to the wake up signal to be sent.

In an embodiment, if the corresponding service type is the first type, the second node determines that the first selectable position is the first position; and if the corresponding service type is the second type, the second node determines that the second selectable position is the first position.

In an embodiment, if the corresponding service type is the first type, the second node determines that the second selectable position is the first position; and if the corresponding service type is the second type, the second node determines that the first selectable position is the first position.

In another implementation, the second node determines the first position according to the corresponding service type and the index of the corresponding paging occasion.

In an embodiment, when the index of the corresponding paging occasion is an even number, if the corresponding service type is the first type, the second node determines that the first selectable position is the first position; and if the corresponding service type is the second type, the second node determines that the second selectable position is the first position. When the index of the corresponding paging occasion is an odd number, if the corresponding service type is the first type, the second node determines that the second selectable position is the first position; and if the corresponding service type is the second type, the second node determines that the first selectable position is the first position.

In an embodiment, when the index of the corresponding paging occasion is an odd number, if the corresponding service type is the first type, the second node determines that the first selectable position is the first position; and if the corresponding service type is the second type, the second node determines that the second selectable position is the first position. When the index of the corresponding paging occasion is an even number, if the corresponding service type is the first type, the second node determines that the second selectable position is the first position; and if the corresponding service type is the second type, the second node determines that the first selectable position is the first position.

In another implementation, the second node determines the first position according to first signaling. The first signaling may be position indication signaling.

In an embodiment, the position indication signaling is 1 bit. When the position indication signaling is 1, the second node determines that the first selectable position is the first position; and when the position indication signaling is 0, the second node determines that the second selectable position is the first position. Alternatively, when the position indication signaling is 0, the second node determines that the first selectable position is the first position; and when the position indication signaling is 1, the second node determines that the second selectable position is the first position.

In another implementation, when the second node sends the wake up signal at the first selectable position and the second selectable position, a corresponding sequence set remains unchanged.

According to the method for transmitting a wake up signal provided in this embodiment, the second node determines the sequence corresponding to the wake up signal to be sent; and the sequence corresponding to the wake up signal is sent to the first node by the second node at the first position; where the wake up signal includes the group wake up signal and/or the common wake up signal, so that the number of blind detections of the PDCCH by the first node is reduced, thus the power consumption of the first node is reduced, and meanwhile, the resource overhead caused by the signal is reduced.

Figure 4:
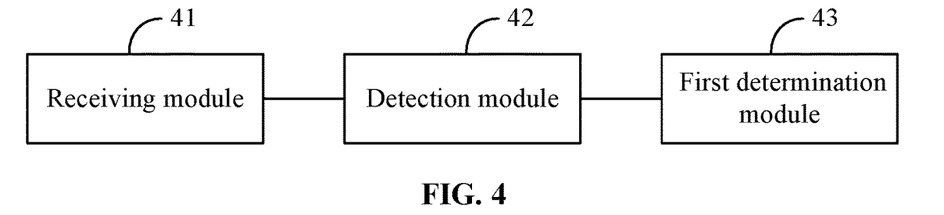
FIG. 4 is a schematic structural diagram of an apparatus for transmitting a wake up signal provided in an embodiment.

FIG. 4 is a schematic structural diagram of an apparatus for transmitting a wake up signal provided in an embodiment. As shown in FIG. 4, the apparatus for transmitting a wake up signal provided in this embodiment includes a receiving module 41, a detection module 42 and a first determination module 43.

The receiving module 41 is configured to receive a wake up signal sent by a second node at a first position.

The wake up signal includes a group wake up signal and/or a common wake up signal.

The detection module 42 is configured to detect the wake up signal by using a sequence corresponding to the wake up signal.

The first determination module 43 is configured to determine a detection of a physical downlink control channel corresponding to the wake up signal according to a detection result.

In a scenario where the wake up signal includes the group wake up signal, the detection module 42 includes a first determination sub-module. The first determination sub-module is configured to determine a first parameter in the sequence corresponding to the group wake up signal according to at least one of a corresponding group index, the number of group wake up signals corresponding to the same time interval, the number of group wake up signals corresponding to a same wake up signal resource, the number of group wake up signals corresponding to the same service type, a service type corresponding to the apparatus for transmitting a wake up signal, or all service types.

The detection module 42 further includes a second determination sub-module. In a scenario where the wake up signal includes the common wake up signal, the second determination sub-module is configured to determine a first parameter in the sequence corresponding to a first common wake up signal according to at least one of a corresponding group index, a service type corresponding to the apparatus for transmitting a wake up signal, or a preset first threshold. In another scenario where the wake up signal includes the common wake up signal, the second determination sub-module is configured to determine a first parameter in the sequence corresponding to a second common wake up signal according to at least one of higher-layer signaling or a legacy wake up signal.

In one implementation, the first determination sub-module is configured to determine the first parameter in the sequence corresponding to the group wake up signal according to the group index.

In another implementation, the first determination sub-module is configured to determine the first parameter in the sequence corresponding to the group wake up signal according to the corresponding group index and the number of group wake up signals corresponding to the same wake up signal resource.

In another implementation, the first determination sub-module is configured to determine the first parameter in the sequence corresponding to the group wake up signal according to the corresponding group index, the number of group wake up signals corresponding to the same service type, and the all service types.

In another implementation, the first determination sub-module is configured to determine the first parameter in the sequence corresponding to the group wake up signal according to the corresponding group index, the service type corresponding to the apparatus for transmitting a wake up signal, and the number of group wake up signals corresponding to the same service type.

In another implementation, the first determination sub-module is configured to determine the first parameter in the sequence corresponding to the group wake up signal according to the corresponding group index and the number of group wake up signals corresponding to the same time interval.

In one implementation, the second determination sub-module is configured to determine the first parameter in the sequence corresponding to the common wake up signal according to the group index and the first threshold.

In another implementation, the second determination sub-module is configured to determine the first parameter in the sequence corresponding to the common wake up signal according to a service type corresponding to a terminal.

In an embodiment, the receiving module includes a third determination sub-module. The third determination sub-module is configured to determine the first position according to at least one of a corresponding group index, a corresponding service type, a corresponding index of a paging occasion, or a preset second threshold.

In one implementation, the third determination sub-module is configured to determine the first position according to the corresponding group index and the second threshold.

In another implementation, the third determination sub-module is configured to determine the first position according to the corresponding index of the paging occasion, the corresponding group index and the second threshold.

In another implementation, the third determination sub-module is configured to determine the first position according to the corresponding service type.

In another implementation, the third determination sub-module is configured to determine the first position according to the corresponding service type and the corresponding index of the paging occasion.

In an embodiment, the first parameter in the sequence is X in the sequence $$W_g(m) = W(m) * e^{\frac{j*2*\pi*n*f(X)}{G}}$$

of the wake up signal, where W(m) is a sequence corresponding to a legacy wake up signal, G is a positive integer greater than 0, X is the first parameter, and m and n are positive integers greater than or equal to 0.

In an embodiment, the first parameter is an index of a sequence in a predefined set of sequences.

The apparatus for transmitting a wake up signal provided in this embodiment is used for implementing the method for transmitting a wake up signal in the embodiment shown in FIG. 2, and the implementation principle of the apparatus for transmitting a wake up signal provided in this embodiment is similar to that of the method for transmitting a wake up signal in the embodiment shown in FIG. 2, and the details are not repeated here.

Figure 5:
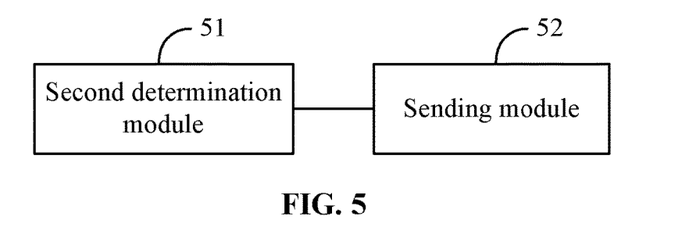
FIG. 5 is a schematic structural diagram of another apparatus for transmitting a wake up signal provided in an embodiment.

FIG. 5 is a schematic structural diagram of another apparatus for transmitting a wake up signal provided in an embodiment. As shown in FIG. 5, the apparatus for transmitting a wake up signal provided in this embodiment includes a second determination module 51 and a sending module 52.

The second determination module 51 is configured to determine a sequence corresponding to a wake up signal to be sent.

The sending module 52 is configured to send the sequence corresponding to the wake up signal to a first node at a first position.

The wake up signal includes a group wake up signal and/or a common wake up signal.

In a scenario where the wake up signal includes the group wake up signal, the second determination module 51 is configured to determine a first parameter in the sequence corresponding to the group wake up signal according to at least one of a group index corresponding to the wake up signal to be sent, the number of group wake up signals corresponding to the same time interval, the number of group wake up signals corresponding to the same wake up signal resource, the number of group wake up signals corresponding to the same service type, a corresponding service type, or all service types.

In a scenario where the wake up signal includes the common wake up signal, the second determination module 51 is configured to determine the first parameter in the sequence corresponding to a first common wake up signal according to at least one of the number of first common wake up signals to be sent, a corresponding service type, higher-layer signaling, or a preset first threshold. The second determination module 51 may be further configured to determine the first parameter in the sequence corresponding to a second common wake up signal according to at least one of higher-layer signaling or a legacy wake up signal.

In an embodiment, the sending module 52 is configured to determine the first position according to at least one of a corresponding group index, a corresponding service type, a corresponding index of a paging occasion, or a preset second threshold.

In an embodiment, the first parameter in the sequence is X in the sequence $$W_g(m) = W(m) * e^{\frac{j*2*\pi*n*f(X)}{G}}$$

of the wake up signal, where W(m) is a sequence corresponding to a legacy wake up signal, G is a positive integer greater than 0, X is the first parameter, and m and n are positive integers greater than or equal to 0.

The apparatus for transmitting a wake up signal provided in this embodiment is used for implementing the method for transmitting a wake up signal in the embodiment shown in FIG. 3, and the implementation principle of the apparatus for transmitting a wake up signal provided in this embodiment is similar to that of the method for transmitting a wake up signal in the embodiment shown in FIG. 3, and the details are not repeated here.

Figure 6:
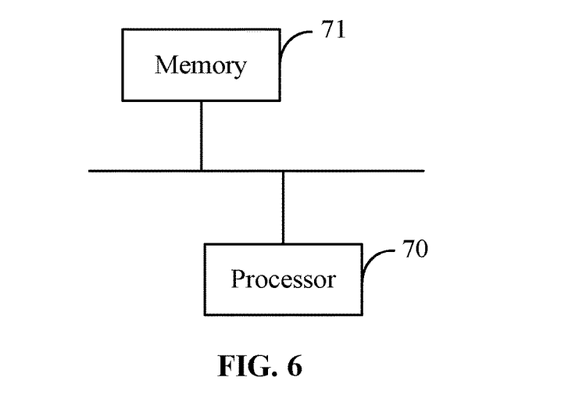
FIG. 6 is a schematic structural diagram of a device for transmitting a wake up signal provided in an embodiment.

FIG. 6 is a schematic structural diagram of a device for transmitting a wake up signal provided in an embodiment, as shown in FIG. 6, the device for transmitting a wake up signal includes a processor 70, and in an embodiment, the device further includes a memory 71; the number of processors 70 in the device for transmitting a wake up signal may be one or more, and one processor 70 is used as an example in FIG. 6. The processor 70 and the memory 71 of the device for transmitting a wake up signal may be connected by a bus or other manners, and FIG. 6 illustrates the connection by the bus as an example.

The memory 71, used as a computer-readable storage medium, may be configured to store a software program, a computer-executable program, and a module, such as a program instruction and a module (such as, the receiving module 41, the detection module 42, and the first determination module 43 in the apparatus for transmitting a wake up signal, or the second determination module 51 and the sending module 52 in the apparatus for transmitting a wake up signal) corresponding to the method for transmitting a wake up signal in the embodiments of the present application. The processor 70 executes various functional applications and data processing of the device for transmitting a wake up signal by executing a software program, an instruction and a module stored in the memory 71, that is, implements the method for transmitting a wake up signal described above.

The memory 71 may mainly include a storage program region and a storage data region. The storage program region may store an operating system, an application program required for at least one function; the storage data region may store data created according to the use of the device for transmitting a wake up signal, and the like. Further, the memory 71 may include a high speed random access memory, and may also include a non-volatile memory, such as at least one magnetic disk storage device, a flash memory device, or other non-volatile solid state storage devices. In some embodiments, the memory 71 may further include a memory remotely disposed relative to the processor 70, which may be connected to the device for transmitting a wake up signal over a network. Embodiments of such networks include, but are not limited to, the Internet, an intranet, a local area network, a mobile communication network, and a combination thereof.

An embodiment of the present application further provides a storage medium containing a computer-executable instruction, and the computer-executable instruction is configured to, when executed by a computer processor, perform the method for transmitting a wake up signal provided in any one of the embodiments of the present application.

The above description is only exemplary embodiments of the present application, and is not intended to limit the scope of protection of the present application.

It should be understood by those skilled in the art that the term "user terminal" covers any suitable type of wireless user equipment, such as a mobile phone, a portable data processing device, a portable web browser or a vehicle-mounted mobile station.

In general, various embodiments of the present application may be implemented in hardware or special purpose circuits, software, logic or any combination thereof. For example, some aspects may be implemented in hardware, while other aspects may be implemented in firmware or software which may be executed by a controller, a microprocessor or other computing devices, although the present application is not limited thereto.

The embodiments of the present application may be implemented by a data processor of a mobile device executing a computer program instruction, for example in a processor entity, or by hardware, or by a combination of software and hardware. The computer program instruction may be an assembler instruction, an instruction set architecture (ISA) instruction, a machine instruction, a machine-related instruction, a microcode, a firmware instruction, state setting data, or source or object codes written in any combination of one or more programming languages.

Any block diagram of the logic flow in the accompanying drawings of the present application may represent program steps, or may represent interconnected logic circuits, modules, and functions, or may represent a combination of program steps and logic circuits, modules, and functions. The computer program may be stored on a memory. The memory may be of any type suitable for the local technical environment and may be implemented using any suitable data storage technology, such as, but not limited to, a read-only memory (ROM), a random access memory (RAM), an optical memory device and system (digital versatile disc (DVD) or compact disk (CD)), etc. A computer readable medium may include a non-transitory storage medium. The data processor may be of any type suitable for the local technical environment, such as, but not limited to, a general-purpose computer, a specialized computer, a microprocessor, a digital signal processor (DSP), an application specific integrated circuit (ASIC), a field-programmable gate array (FPGA)), and a processor based on a multi-core processor architecture.

What is claimed is:

1. A method for transmitting a wake up signal, comprising:
    receiving, by a first node, a wake up signal sent by a second node at a first position; wherein the wake up signal comprises at least one of a group wake up signal or a common wake up signal;
    detecting, by the first node, the wake up signal by using a sequence corresponding to the wake up signal; and
    determining, by the first node, a detection of a physical downlink control channel corresponding to the wake up signal according to a detection result of the wake up signal;
    wherein the wake up signal comprises the group wake up signal; and
    wherein detecting, by the first node, the wake up signal by using the sequence corresponding to the wake up signal comprises:

determining, by the first node, a first parameter in the sequence corresponding to the group wake up signal according to:
(1) a group index corresponding to the first node; and
(2) at least one of (i) a number of group wake up signals corresponding to a same time interval, (ii) a number of group wake up signals corresponding to a same wake up signal resource, (iii) a number of group wake up signals corresponding to a same service type, or (iv) a service type corresponding to the first node.

2. The method of claim 1, wherein the wake up signal comprises the common wake up signal;
wherein detecting, by the first node, the wake up signal by using the sequence corresponding to the wake up signal comprises:
determining, by the first node, a first parameter in the sequence corresponding to a first common wake up signal according to at least one of a group index corresponding to the first node, a service type corresponding to the first node, higher-layer signaling, or a preset first threshold.

3. The method of claim 2, wherein determining, by the first node, the first parameter in the sequence corresponding to the first common wake up signal according to the at least one of the group index corresponding to the first node, the service type corresponding to the first node, the higher-layer signaling, or the preset first threshold comprises:
determining, by the first node, the first parameter in the sequence corresponding to the first common wake up signal according to the group index and the first threshold; or
determining, by the first node, the first parameter in the sequence corresponding to the first common wake up signal according to the service type corresponding to the first node.

4. The method of claim 2, wherein the first parameter in the sequence is X in a sequence $$W_g(m) = W(m) * e^{\frac{j*2*\pi*n*f(X)}{G}}$$

of the wake up signal, wherein W(m) is a sequence corresponding to a legacy wake up signal, G is a positive integer greater than 0, X is the first parameter, and m and n are positive integers greater than or equal to 0.

5. The method of claim 2, wherein the first parameter is an index of a sequence in a predefined set of sequences.

6. The method of claim 1, wherein the wake up signal comprises the common wake up signal;
wherein detecting, by the first node, the wake up signal by using the sequence corresponding to the wake up signal comprises:
determining, by the first node, a first parameter in the sequence corresponding to a second common wake up signal according to at least one of higher-layer signaling or a legacy wake up signal.

7. The method of claim 6, wherein the first parameter is an index of a sequence in a predefined set of sequences.

8. The method of claim 1, wherein determining, by the first node, the first parameter in the sequence corresponding to the group wake up signal according to the group index corresponding to the first node and the at least one of the number of group wake up signals corresponding to the same time interval, the number of group wake up signals corresponding to the same wake up signal resource, the number of group wake up signals corresponding to the same service type, the service type corresponding to the first node, or the all service types comprises one of:
determining, by the first node, the first parameter in the sequence corresponding to the group wake up signal according to the group index corresponding to the first node and the group wake up number of signals corresponding to the same wake up signal resource;
determining, by the first node, the first parameter in the sequence corresponding to the group wake up signal according to the group index corresponding to the first node, the number of the group wake up signals corresponding to the same service type, and the all service types;
determining, by the first node, the first parameter in the sequence corresponding to the group wake up signal according to the group index corresponding to the first node, the service type corresponding to the first node, and the number of group wake up signals corresponding to the same service type; or
determining, by the first node, the first parameter in the sequence corresponding to the group wake up signal according to the group index corresponding to the first node and the number of group wake up signals corresponding to the same time interval.

9. The method of claim 1, wherein before receiving, by the first node, the wake up signal sent by the second node at the first position, the method further comprises:
determining, by the first node, the first position according to at least one of a group index corresponding to the first node, a service type corresponding to the first node, an index of a paging occasion corresponding to the first node, or a preset second threshold.

10. The method of claim 9, wherein determining, by the first node, the first position according to the at least one of the group index corresponding to the first node, the service type corresponding to the first node, the index of the paging occasion corresponding to the first node, or the preset second threshold comprises one of:
determining, by the first node, the first position according to the group index corresponding to the first node and the second threshold;
determining, by the first node, the first position according to the index of the paging occasion corresponding to the first node, the group index corresponding to the first node and the second threshold;
determining, by the first node, the first position according to the service type corresponding to the first node; or
determining, by the first node, the first position according to the service type corresponding to the first node and the index of the paging occasion corresponding to the first node.

11. The method of claim 1, wherein the first parameter in the sequence is X in a sequence $$W_g(m) = W(m) * e^{\frac{j*2*\pi*n*f(X)}{G}}$$

of the wake up signal, wherein W(m) is a sequence corresponding to a legacy wake up signal, G is a positive integer greater than 0, X is the first parameter, and m and n are positive integers greater than or equal to 0.

12. The method of claim 1, wherein the first parameter is an index of a sequence in a predefined set of sequences.

13. A non-transitory computer-readable storage medium storing a computer program, wherein the computer program, when executed by a processor, implements the method for transmitting the wake up signal of claim 1.

14. A method for transmitting a wake up signal, comprising:
determining, by a second node, a sequence corresponding to a wake up signal to be sent; and
sending, by the second node, the sequence corresponding to the wake up signal to a first node at a first position;
wherein the wake up signal comprises at least one of a group wake up signal or a common wake up signal;
wherein the wake up signal comprises the group wake up signal; and
wherein determining, by the second node, the sequence corresponding to the wake up signal to be sent comprises:
determining, by the second node, a first parameter in the sequence corresponding to the group wake up signal according to:
(1) a group index corresponding to the wake up signal to be sent; and
(2) at least one of (i) a number of group wake up signals corresponding to a same time interval, (ii) a number of group wake up signals corresponding to a same wake up signal resource, (iii) a number of group wake up signals corresponding to a same service type, or (iv) a service type corresponding to the first node.

15. The method of claim 14, wherein the wake up signal comprises the common wake up signal;
wherein determining, by the second node, the sequence corresponding to the wake up signal to be sent comprises:
determining, by the second node, a first parameter in the sequence corresponding to a first common wake up signal according to at least one of a number of first common wake up signals to be sent, a service type corresponding to a first common wake up signal to be sent, higher-layer signaling, or a preset first threshold; or
determining, by the second node, a first parameter in the sequence corresponding to a second common wake up signal according to at least one of higher-layer signaling or a legacy wake up signal.

16. The method of claim 14, wherein sending, by the second node, the sequence corresponding to the wake up signal to the first node at the first position comprises:
determining, by the second node, the first position according to at least one of a group index corresponding to the wake up signal to be sent, a service type corresponding to the wake up signal to be sent, an index of a paging occasion corresponding to the wake up signal to be sent, or a preset second threshold.

17. The method of claim 14, wherein the first parameter in the sequence is X in a sequence $$W_g(m) = W(m) * e^{\frac{j*2*\pi*n*f(X)}{G}}$$

of the wake up signal, wherein W(m) is a sequence corresponding to a legacy wake up signal, G is a positive integer greater than 0, X is the first parameter, and m and n are positive integers greater than or equal to 0.

18. A device for transmitting a wake up signal, comprising a processor, wherein the processor is configured to, when executing a computer program, implement the following:
receiving, by a first node, a group wake up signal sent by a second node at a first position; wherein the wake up signal comprises at least one of a group wake up signal or a common wake up signal;
detecting, by the first node, the wake up signal by using a sequence corresponding to the wake up signal; and
determining, by the first node, a detection of a physical downlink control channel corresponding to the wake up signal according to a detection result of the wake up signal;
wherein the wake up signal comprises the group wake up signal; and
wherein detecting, by the first node, the wake up signal by using the sequence corresponding to the wake up signal comprises:
determining, by the first node, a first parameter in the sequence corresponding to the group wake up signal according to:
(1) a group index corresponding to the first node; and
(2) at least one of (i) a number of group wake up signals corresponding to a same time interval, (ii) a number of group wake up signals corresponding to a same wake up signal resource, (iii) a number of group wake up signals corresponding to a same service type, or (iv) a service type corresponding to the first node.

* * * * *